June 15, 1965     J. MULLER     3,189,676
REINFORCED PIPES INCORPORATING A GROUND WIRE
Filed Feb. 1, 1961     2 Sheets-Sheet 1
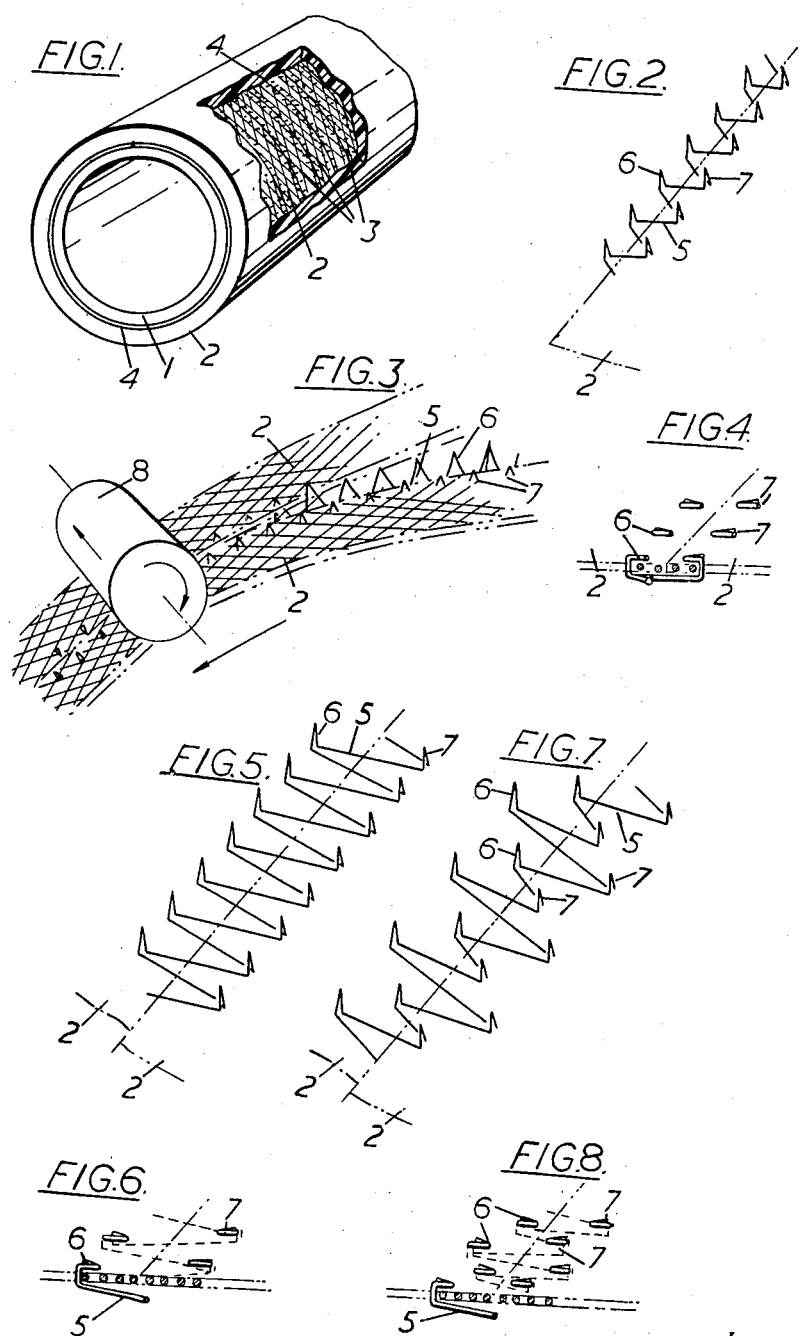
Inventor
JACQUES MULLER June 15, 1965     J. MULLER     3,189,676
REINFORCED PIPES INCORPORATING A GROUND WIRE
Filed Feb. 1, 1961     2 Sheets-Sheet 2
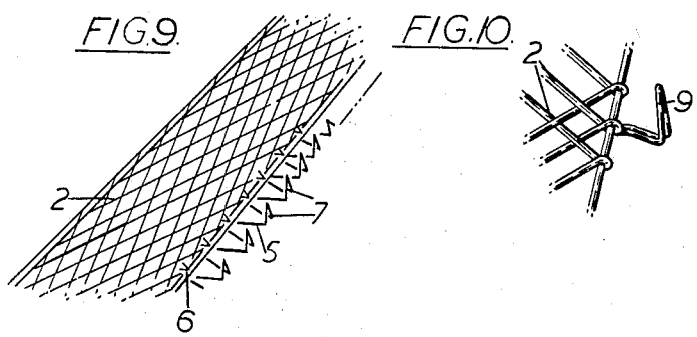
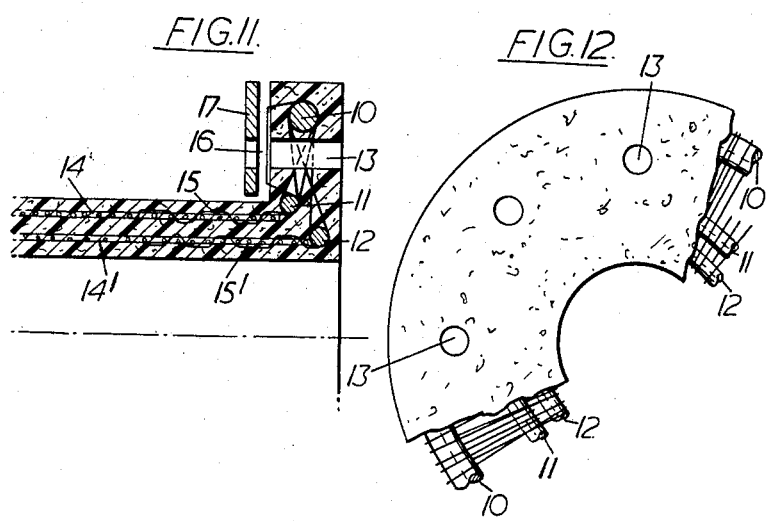
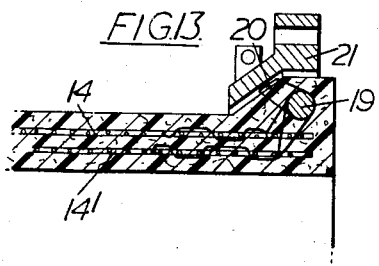
Inventor
JACQUES MULLER
By *Imirie & Smiley*
Attorneys

United States Patent Office 3,189,676
Patented June 15, 1965

3,189,676
REINFORCED PIPES INCORPORATING A
GROUND WIRE
Jacques Muller, 123 Ave. du General de Gaulle,
La Garenne-Colombes, France
Filed Feb. 1, 1961, Ser. No. 86,427
Claims priority, application France, Mar. 17, 1960,
821,569
12 Claims. (Cl. 174—47)

This invention relates to a process for the manufacture of reinforced pipes, more particularly but not exclusively pipes of the flexible or semi-flexible type made of rubber, plastic or like material, for example, flexible and detachable pipe lines used for the transfer of liquid or gaseous fluids.

One object of the invention is to provide a process to enable a pipe to be made which, while flexible, has high diametrical and longitudinal strength while retaining its initial flexibility and which has high resistance to wear and damage caused by friction, twisting, crushing, shock and high internal pressures. Such a pipe possesses a long life and a high reliability factor.

Another object is to provide a process for manufacturing reinforced pipes by using one or more bands (single, or tubular and flattened) made of woven metal wires or vegetable, plastic or elastic threads wound in spirals with the contiguous edges of the band or bands fastened together either continuously or at intervals, the fastening being effected simultaneously with the winding of the bands.

According to the invention a process for manufacturing reinforced flexible pipes comprises the steps of winding at least one band, made of woven, braided or twisted material in a spiral with the edges of the band contiguous, fastening the contiguous edges to each other, and embedding the reinforcement constituted by the band in the pipe.

The cylindrical reinforcement may be produced by winding the band on a mandrel of appropriate dimensions for subsequently embedding in the mass of the finished pipe or it may be wound on to a base pipe which, after having the reinforcement wound upon it, is covered and coated by a vulcanised or other covering of the same material as that of the base pipe, or of a different material, the covering material being in any case of such a nature that it will adhere well to the base pipe.

The contiguous edges of the band or bands may be fastened by independent fasteners of U-shape applied at intervals, the arms of the fasteners forming teeth which are longer than the thickness of the reinforcement band, the teeth being flattened on to the band after being pushed through the contiguous edges of the band. Alternatively the fastening means may consist of a continuous strip formed by bending wire repeatedly back upon itself to form a zig-zag in one plane and turning the bent ends upwards at right angles to the said one plane, to form teeth which are pushed through the contiguous edges of the band and then turned over.

The cylindrical reinforcement thus produced may be a single layer, that is to say, it may comprise only one band wound in a spiral with its contiguous edges joined together. It may alternatively be composed of a plurality of superimposed bands of the same kinds or of different kinds wound in the same or in opposite directions.

The invention includes pipes made by the process.

Certain embodiments of the invention will now be described by way of example, having reference to the accompanying drawings in which—

FIGURE 1 shows, partly in section, a pipe manufactured by the process according to the invention;

FIGURE 2 illustrates a continuous strip of fastening devices;

FIGURE 3 shows diagrammatically the winding of the reinforcement base on to a base pipe and its simultaneous fastening;

FIGURE 4 is a diagram showing the completed fastening;

FIGURE 5 shows a strip of fastenings similar to those of FIGURE 2 but more widely spaced;

FIGURE 6 shows the fastening of FIGURE 5 after closure;

FIGURE 7 shows a strip of fastenings of modified form;

FIGURE 8 shows the fastenings of FIGURE 7 after closure;

FIGURES 9 and 10 show the reinforcement band formed with fasteners along one edge;

FIGURE 11 is a partial section of reinforced pipe formed with a flat flange and including a further rigid coupling flange;

FIGURE 12 shows a part of the face of the flange of FIGURE 11 broken away to show the reinforcement;

FIGURE 13 shows in section the details of a reinforced conical flange with provision for electrical connection to the reinforcement.

Referring to the drawings, FIGURE 1 shows a reinforced pipe made by first producing a base pipe 1, then winding on to it a reinforcement band 2 in the form of a spiral with contiguous edges. The reinforcement is composed of a band of woven metal or other woven braid or tape of fairly wide, open mesh. It may be woven from metal wire or fibrous material, such as vegetable fibre threads, or threads produced from man-made fibres. The contiguous edges of the band are fastened together as the band is wound. For this purpose independent fastenings can be used, applied at intervals, or a continuous strip of fastenings may be used. This produces a cylindrical reinforcement 3. After being applied, the cylindrical reinforcement 3 is embedded in or covered by a layer 4 of material by moulding, coating or the like, which may be vulcanised. The layer 4 may be of the same material as the base pipe 1 or it may be of a different material, provided that its character is such that it will adhere properly to the base pipe. The open meshes of the braid allow the coating to pass through, so that the wires or threads of the braid are completely covered and the coating material comes into contact with the surface of the base pipe and adheres thereto. It will be evident that the reinforcement 3 becomes an integral part of the pipe, protecting it perfectly and being capable of flexing with the pipe.

Instead of winding the band on to a base pipe it may be wound on to a cylindrical mandrel of appropriate size, the contiguous edges being fastened together as previously described, and the reinforcement may then be embedded in a pipe by moulding, extrusion or similar processes.

For rapidly effecting the fastening of the contiguous edges of the band during the winding thereof use is preferably made of a strip of fasteners formed as shown in FIGURE 2 by bending a metal wire 5 continuously to and fro to form a zig-zag in one plane and then bending the points of the zig-zag up at right angles to this plane to form two rows of teeth 6 and 7 of a height greater than the thickness of the band. The toothed strip is wound on slightly ahead of the band in such a manner that one row of teeth penetrates the edges of one convolution of the band and the other row of teeth penetrates the contiguous edge of the next convolution of the band. After winding, the teeth project through the band and they are bent over in order to fix them. Conveniently this may be done continuously as the band is wound by means of a cylindrical roller 8 shown diagrammatically in FIG- URE 3, to turn down the ends of the teeth as shown in FIGURE 4.

If the edges of the band are not very strong the zigzag strip of toothed fastenings may be made with the teeth more widely spaced as shown in FIGURE 5 the effect, after turning over the ends of the teeth, being as shown in FIGURE 6. As an alternative the zig-zag portions of the fastened strip may be made with adjacent teeth separated by different distances, as shown in FIGURE 7, so that there are two parallel rows of teeth to penetrate each of the contiguous edges of the band. The appearance after the ends of the teeth have been turned over is then as shown in FIGURE 8.

In another kind of band, the teeth may be formed on the edge of the braid itself by appropriate weaving, particularly where the braid is made of metal wire. Such a braid is shown in FIGURE 9 and an enlarged portion of one edge of the band is shown in FIGURE 10. The teeth of one convolution of the band or braid then penetrate the other edge of the next convolution and the ends of the teeth are finally turned over in the manner already described.

The reinforcement may be formed of a plurality of layers all formed concentrically by braid or tape in a single length or by a plurality of braids or tapes which are wound one upon the other, in the same or in opposite directions.

Where the reinforced pipes are to be joined, coupling flanges must be provided and these must also be reinforced. FIGURE 11 shows one example of a reinforced flat flange comprising concentric rings 10, 11 and 12 which may conveniently be made of metal, and which are embedded in the flange. These rings are appropriately spaced to permit the passage of bolts through the holes 13 in the flange and are connected together and to the reinforcement 14 and 14' of the pipe proper by interwoven wires 15, 15'. One or more of the wires pass to the outside as indicated by reference 16 and are brought into electrical contact with a flat metal counter-flange 17, comprising an annular member encompassing the pipe so that when the coupling is pulled together the reinforcement is in electrical contact with the counter-flanges, whereby any charge of static electricity which may have accumulated may be discharged.

In a second example of a flanged pipe shown in FIGURE 13 the flange is of conical type, such a flange being conveniently of smaller diameter and only comprising a single reinforcement ring 19, connected as before to the reinforcement of the pipe by means of wires. One or more of the metal wires indicated by reference 20 are brought to the exterior so that electrical contact is made with a metal counter-flange 21 for discharging static electricity, said counter flange 21 comprising an annular member encompassing the pipe and having a conical portion adapted to abut against the conical portion of the pipe flange.

I claim:

1. A reinforced pipe comprising a base pipe of flexible material, a reinforcement made of a band of woven, braided material wound in a spiral around said base pipe, with the edges of the band contiguous, and means to retain together the contiguous edges of the spirally wound band, said means comprising a plurality of fasteners, each having a portion secured to one edge of said spiral band and another portion defining a tooth which extends through the contiguous edge of said spiral band and is bent over.

2. A pipe as claimed in claim 1 in which the contiguous edges are fastened together by means of independent U-shaped fasteners applied at intervals, the arms of the fasteners forming teeth which are pushed through the said contiguous edges and bent over.

3. A pipe as claimed in claim 1 in which the contiguous edges are fastened by means of a continuous strip of fasteners made by bending metal wire repeatedly back upon itself to form a zig-zag in one plane and turning the bent ends upwards at right angles to the said one plane to form teeth which are pushed through the contiguous edges and bent over.

4. A pipe as claimed in claim 1 in which the contiguous edges are fastened by means of a continuous strip of fasteners made in such a manner that adjacent teeth are separated by different distances so that two parallel rows of teeth are provided to penetrate each of the said contiguous edges.

5. A pipe as claimed in claim 1 in which the band is so woven that spaced upwardly projecting teeth are left along one edge, the teeth being pushed through the contiguous edge of the band and bent over.

6. A pipe as claimed in claim 1 comprising a plurality of layers of reinforcement.

7. A pipe as claimed in claim 6 in which successive layers are formed by winding the band in opposite directions.

8. A pipe as claimed in claim 1 comprising a flat flange integral with the pipe and containing a plurality of reinforcing rings of different diameters arranged substantially concentrically, the rings being joined to the pipe reinforcement by means of wires, and a flat metal counter-flange, comprising an annular member encompassing the pipe and movable against the pipe flange.

9. A pipe as claimed in claim 8 in which at least one of the wires is brought to the surface of the flange to make contact with the counter-flange to discharge static electricity in the pipe reinforcement, said wires and said counter flange as well as said pipe reinforcement means being of electrically conductive material.

10. A pipe as claimed in claim 1 comprising a conical flange containing at least one embedded metal ring, wires disposed substantially radially joining the ring to the pipe reinforcement, and a conical metal counter-flange, comprising an annular member encompassing the pipe and having a conical portion adapted to abut against the conical portion of the pipe flange.

11. A pipe as claimed in claim 10 in which at least one of the wires is brought to the surface of the flange to make contact with the counter-flange to discharge static electricity in the pipe reinforcement, said wires and said counter flange as well as said pipe reenforcement means being of electrically conductive material.

12. The combination set forth in claim 1 in which a covering is applied over said reinforcement, said covering adhering to said base pipe and to said reinforcement whereby said covering, said reinforcement and said base pipe form an integral unit.

References Cited by the Examiner

UNITED STATES PATENTS

| | | | |
|---|---|---|---|
| 408,161 | 7/89 | Bristol | 24—36 |
| 630,636 | 8/89 | Sundh | 174—109 X |
| 998,827 | 7/11 | Armstrong | 174—109 X |
| 1,718,920 | 6/29 | Frederickson | 174—124 |
| 1,948,410 | 2/34 | Williamson | 138—127 |
| 1,969,227 | 8/34 | MacLachlan | 156—187 |
| 2,032,712 | 3/36 | Morrison et al. | 174—108 X |
| 2,090,794 | 8/37 | Harrah | 138—133 X |
| 2,244,635 | 6/41 | Williamson | 174—47 X |
| 2,479,483 | 8/49 | Ekleberry | 174—48 X |
| 2,511,916 | 6/50 | Hollingsworth et al. | 138—127 |
| 2,828,798 | 4/58 | Hopkins et al. | 156—187 |
| 2,911,236 | 11/59 | Thibault | 138—133 X |
| 3,042,737 | 7/62 | Brumbach et al. | 174—47 |

JOHN F. BURNS, *Primary Examiner.*

EDWARD V. BENHAM, JOHN P. WILDMAN, DARRELL L. CLAY, *Examiners.*